US012617409B2

(12) United States Patent
Dadoush et al.

(10) Patent No.: US 12,617,409 B2
(45) Date of Patent: May 5, 2026

(54) DRUNK DRIVING PREVENTION SYSTEM AND METHOD

(71) Applicant: HYUNDAI MOBIS CO., LTD., Seoul (KR)

(72) Inventors: Joseph Ramzi Dadoush, Macomb, MI (US); Salam Said Neshewait, Westland, MI (US)

(73) Assignee: HYUNDAI MOBIS CO., LTD., Seoul (KR)

( * ) Notice: Subject to any disclaimer, the term of this patent is extended or adjusted under 35 U.S.C. 154(b) by 175 days.

(21) Appl. No.: 18/226,989

(22) Filed: Jul. 27, 2023

(65) Prior Publication Data

US 2025/0033646 A1     Jan. 30, 2025

(51) Int. Cl.
| | |
|---|---|
| *B60W 40/08* | (2012.01) |
| *B60W 50/12* | (2012.01) |
| *G06V 20/59* | (2022.01) |
| *G06V 40/16* | (2022.01) |

(52) U.S. Cl.
CPC ............ *B60W 40/08* (2013.01); *B60W 50/12* (2013.01); *G06V 20/597* (2022.01); *G06V 40/16* (2022.01); *B60W 2420/403* (2013.01); *B60W 2540/043* (2020.02); *B60W 2540/21* (2020.02); *B60W 2540/221* (2020.02); *B60W 2540/227* (2020.02); *B60W 2540/24* (2013.01)

(58) Field of Classification Search
CPC ........ B60K 28/02; B60K 28/04; B60K 28/06; B60K 28/063; B60K 28/066; B60W 40/08; B60W 50/12; B60W 2040/0836; B60W 2420/403; B60W 2540/043; B60W 2540/21; B60W 2540/221; B60W 2540/227; B60W 2540/24; G06V 20/597; G06V 40/16
See application file for complete search history.

(56) References Cited

U.S. PATENT DOCUMENTS

| | | | | |
|---|---|---|---|---|
| 6,748,792 | B1 * | 6/2004 | Freund | G07C 9/00563 340/426.2 |
| 7,451,852 | B2 * | 11/2008 | Stewart | B60K 28/063 340/576 |
| 10,493,996 | B2 * | 12/2019 | Phillips | B60W 50/0098 |
| 10,663,440 | B2 * | 5/2020 | DeVries | G01N 33/4972 |
| 11,793,468 | B2 * | 10/2023 | Williams | A61B 5/6893 |
| 2007/0024454 | A1 * | 2/2007 | Singhal | G08B 21/06 340/576 |

(Continued)

*Primary Examiner* — Peter D Nolan
*Assistant Examiner* — Ce Li Li
(74) *Attorney, Agent, or Firm* — MORGAN, LEWIS & BOCKIUS LLP

(57) ABSTRACT

A drunk driving prevention system includes a biometric authentication device that performs biometric authentication of a driver step by step when startup of the vehicle is requested, a breathalyzer that measures a drinking level of the driver whose biometric authentication has been completed, a driver monitoring device that monitors the driver's state in a vehicle while a drinking level of the driver is measured, and a controller that allows or blocks startup of the vehicle based on a result of measuring the driver's drinking level, wherein the biometric authentication device adjusts biometric authentication phases for the driver in a case of an exceptional vehicle where a front seat of the vehicle is configured as an independent space.

18 Claims, 16 Drawing Sheets

(56)            References Cited

U.S. PATENT DOCUMENTS

| | | | |
|---|---|---|---|
| 2007/0200663 A1* | 8/2007 | White | B60R 25/255 340/5.31 |
| 2007/0239992 A1* | 10/2007 | White | B60K 28/063 713/186 |
| 2010/0294583 A1* | 11/2010 | Biondo | A61B 5/082 340/576 |
| 2011/0050407 A1* | 3/2011 | Schoenfeld | A61B 10/0051 340/426.11 |
| 2012/0268259 A1* | 10/2012 | Igel | B60R 25/00 701/1 |
| 2014/0297112 A1* | 10/2014 | Howe | G07C 9/28 701/36 |
| 2020/0026838 A1* | 1/2020 | Choi | G06V 40/70 |
| 2021/0171045 A1* | 6/2021 | An | B60W 40/08 |
| 2023/0294514 A1* | 9/2023 | Mohanty | A61B 5/14546 180/272 |

* cited by examiner

BIOMETRIC
AUTHENTICATION DEVICE
160

FINGERPRINT
AUTHENTICATION MODULE
161

INTERACTIVE AI MODULE
165

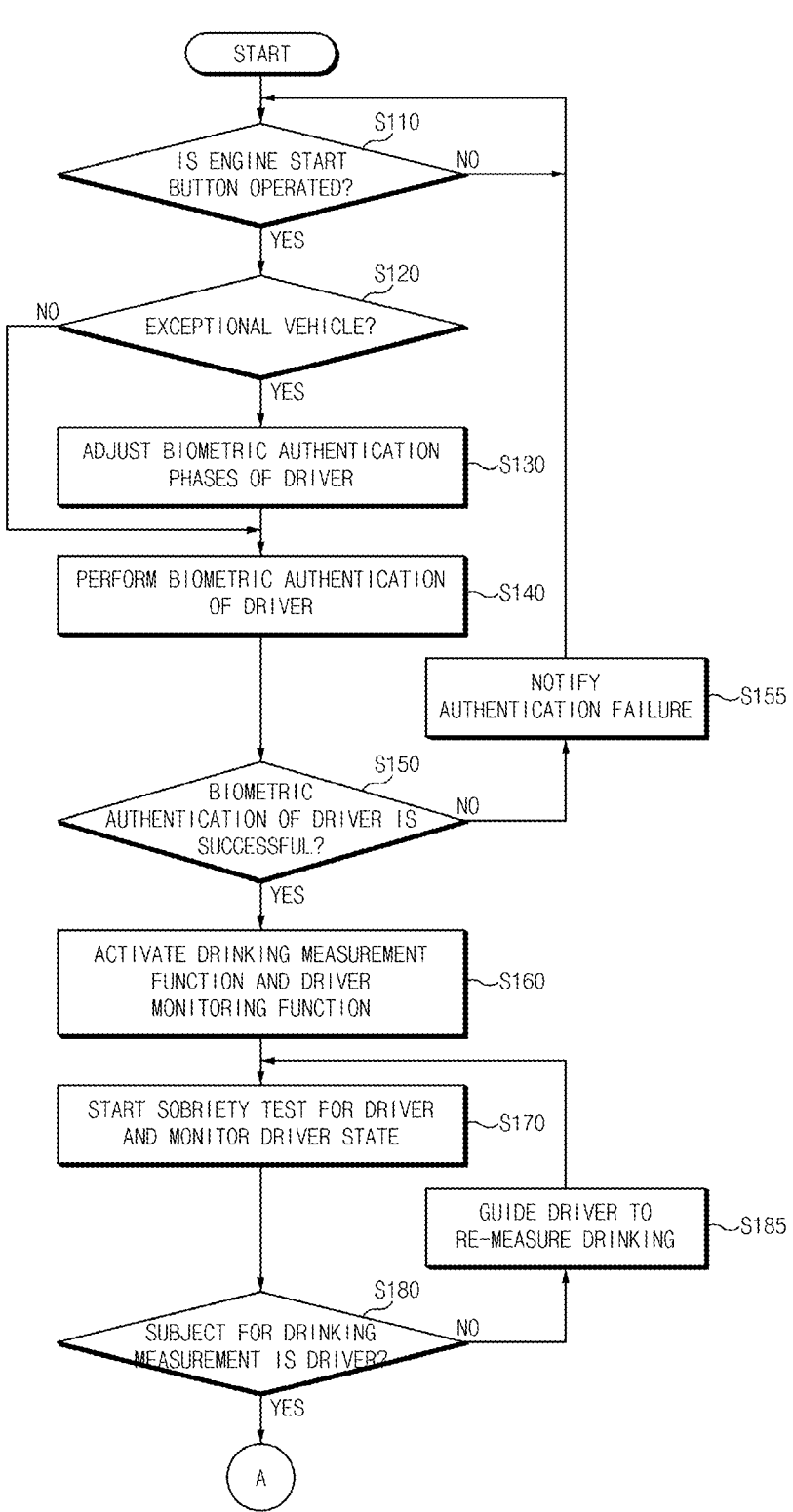
F I G . 10A

DRUNK DRIVING PREVENTION SYSTEM AND METHOD

TECHNICAL FIELD

The present disclosure relates to a drunk driving prevention system and method.

BACKGROUND

Drunk driving is a factor that accounts for a large portion of car accidents, and a large number of deaths occur every year due to drunk driving accidents.

Recently, to prevent drunk driving accidents, a system for measuring a driver's drinking level is being mounted in a vehicle. In particular, in some countries, laws are being made to apply a system for measuring a driver's drinking level to a vehicle.

In this way, the system for measuring the driver's drinking level, which is mounted in the vehicle, measures the driver's drinking level when the driver attempts to drive, and prevents the vehicle from starting when the driver is in a drunk state, thereby preventing a drunk driving accident.

However, there may be a case where a passenger takes a test of measuring a drinking level on behalf of a drunk driver, and in this case, a problem occurs in which that the passenger has passed the test and startup of the vehicle is allowed, which may eventually lead to a drunk driving accident.

Meanwhile, in the case of a special vehicle such as a pickup truck or a fleet vehicle, separate monitoring for a passenger seat is not required because a rear seat is not provided or even if there is a rear seat, the rear seat is separated from a front seat. Therefore, it is difficult to apply a drunk driving prevention system applied to general vehicles to such a special vehicle.

SUMMARY

The present disclosure has been made to solve the above-mentioned problems occurring in the prior art while advantages achieved by the prior art are maintained intact.

An aspect of the present disclosure provides a drunk driving prevention system and method capable of performing driver authentication through several phases when measuring the driver's drinking level, and at the same time, monitoring the states of a driver and passengers in a vehicle during the measurement of the drinking level, thereby facilitating driver identification and a sobriety test, and preventing a drunk driving accident by blocking startup of the vehicle when a driver is in a drunk state.

An aspect of the present disclosure provides a drunk driving prevention system and method a drunk driving prevention system and method capable of adjusting biometric authentication phases for a driver and omitting monitoring of a passenger's state to increase the operating efficiency of the system because it is unnecessary to identify the state of a backseat passenger during the sobriety test in the case of an exceptional vehicle in which a front seat space is configured as an independent space.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a drunk driving prevention system includes a biometric authentication device that performs a biometric authentication of a driver step by step when startup of the vehicle is requested, a breathalyzer that measures a drinking level of the driver whose biometric authentication has been completed, a driver monitoring device that monitors a state of a driver in a vehicle while the drinking level of the driver is measured, and a controller that allows or blocks startup of the vehicle based on a result of measuring the driver's drinking level, wherein the biometric authentication device adjusts biometric authentication phases for the driver in a case of an exceptional vehicle where a front seat of the vehicle is configured as an independent space.

According to an embodiment, the biometric authentication device may perform the biometric authentication of the driver based on the adjusted biometric authentication phases among recognition of the driver's fingerprint, recognition of the driver's voice, and question and answer through conversation with the driver, when the vehicle is the exceptional vehicle.

According to an embodiment, the biometric authentication device includes a fingerprint recognition module that recognizes the driver by determining whether the fingerprint obtained from the driver matches a previously registered fingerprint of the driver and an interactive AI module that recognizes the driver's voice, asks the driver a question, and recognize the driver based on the driver's response to the question.

According to an embodiment, the controller may activate a drinking measurement function and a driver monitoring function when the biometric authentication of the driver is successful.

According to an embodiment, the breathalyzer may compare alcohol concentration information of the driver obtained from a breathalyzer sensor installed in the vehicle with a preset first reference value and a preset second reference value to measure the drinking level of the driver, when the drinking measurement function is activated.

According to an embodiment, the first reference value may be set to a blood alcohol concentration value for determining whether alcohol is consumed, and the second reference value may be set to an acceptable blood alcohol concentration.

According to an embodiment, the breathalyzer may determine that the driver is not in the drunk state when the alcohol concentration of the driver is less than or equal to the first reference value, determine that the alcohol concentration of the driver is acceptable when the alcohol concentration of the driver is greater than the first reference value and is less than or equal to the second reference value, and determine that the driver is in a drunk state when the alcohol concentration of the driver is greater than the second reference value.

According to an embodiment, the controller may allow startup of the vehicle when it is identified that the driver is not in the drunk state, allow startup of the vehicle and activate the driver monitoring function when it is identified that the driver is in an acceptable drinking level, and block startup of the vehicle when it is identified that the driver is in the drunk state.

According to an embodiment, the driver monitoring device may determine whether a subject for drinking measurement is an authenticated driver while the drinking level of the deriver is measured when the driver monitoring function is activated.

According to an embodiment, wherein the driver monitoring device may recognize a face of the subject for drinking measurement by analyzing an image obtained from a camera that captures a space of a driver seat of the exceptional vehicle while the drinking level of the driver is measured, and determine whether the subject for drinking measurement is the authenticated driver based on a result of the face recognition.

According to an embodiment, the driver monitoring device may recognize a weight and a physique of the subject for drinking measurement by analyzing data obtained from a seat sensor of the driver seat and determine whether the subject for drinking measurement is the authenticated driver based on a result of the recognition.

According to an embodiment, the controller may guide the driver to take the sobriety test again when it is identified that the subject for drinking measurement is not the driver, and the breathalyzer may re-measure the drinking level of the driver.

According to an aspect of the present disclosure, a drunk driving prevention method includes performing a biometric authentication of a driver step by step when startup of the vehicle is requested, measuring a drinking level of the driver whose biometric authentication has been completed, monitoring the state of the driver in a vehicle while a drinking level of the driver is measured, and allowing or blocking startup of the vehicle based on a result of measuring the driver's drinking level, wherein the drunk driving prevention method may further include adjusting biometric authentication phases for the driver in a case of an exceptional vehicle where a front seat of the vehicle is configured as an independent space.

According to an embodiment, the performing of the biometric authentication of the driver step by step includes performing the biometric authentication of the driver based on the adjusted biometric authentication phases among recognition of the driver's fingerprint, recognition of the driver's voice, and question and answer through conversation with the driver, when the vehicle is the exceptional vehicle.

According to an embodiment, the drunk driving prevention method may further include activating a drinking measurement function and a driver monitoring function when the biometric authentication of the driver is successful.

According to an embodiment, the measuring of the drinking level may include comparing alcohol concentration information of the driver obtained from a breathalyzer sensor installed in the vehicle with a preset first reference value and a preset second reference value, and determining that the driver is not in a drunk state when the alcohol concentration of the driver is less than or equal to the first reference value, determining that the alcohol concentration of the driver is acceptable when the alcohol concentration of the driver is greater than the first reference value and is less than or equal to the second reference value, and determining that the driver is in the drunk state when the alcohol concentration of the driver is greater than the second reference value.

According to an embodiment, the first reference value may be set to a blood alcohol concentration value for determining whether alcohol is consumed, and wherein the second reference value may be set to an acceptable blood alcohol concentration.

According to an embodiment, the allowing or blocking startup of the vehicle may include allowing startup of the vehicle when it is identified that the driver is not in the drunk state, allowing startup of the vehicle and activating the driver monitoring function when it is identified that the driver is in an acceptable drinking level, and blocking startup of the vehicle when it is identified that the driver is in a drunk state.

According to an embodiment, the monitoring of the driver may include recognizing a face of a subject for drinking measurement by analyzing an image obtained from a camera that captures a driver seat space of the exceptional vehicle while the drinking level of the driver is measured, and determining whether the subject for drinking measurement is the driver based on a result of the face recognition, when the driver monitoring function is activated, and recognizing a weight and a physique of the subject to the sobriety test by analyzing data obtained from a seat sensor of the driver seat and determining whether the subject for drinking measurement based on a is the driver based on a result of the recognition.

According to an embodiment, the drunk driving prevention method may further include guiding the driver to take the sobriety test again when it is identified that the subject for drinking measurement is not the driver, and re-measuring the drinking level of the driver.

BRIEF DESCRIPTION OF THE DRAWINGS

The above and other objects, features and advantages of the present disclosure will be more apparent from the following detailed description taken in conjunction with the accompanying drawings:

FIG. 3 is a diagram illustrating a detailed configuration of a biometric authentication device according to an embodiment of the present disclosure;

FIGS. 10A and 10B is a diagram illustrating an operational flow of a drunk driving prevention method according to an embodiment of the present disclosure.

DETAILED DESCRIPTION

Figure 1:
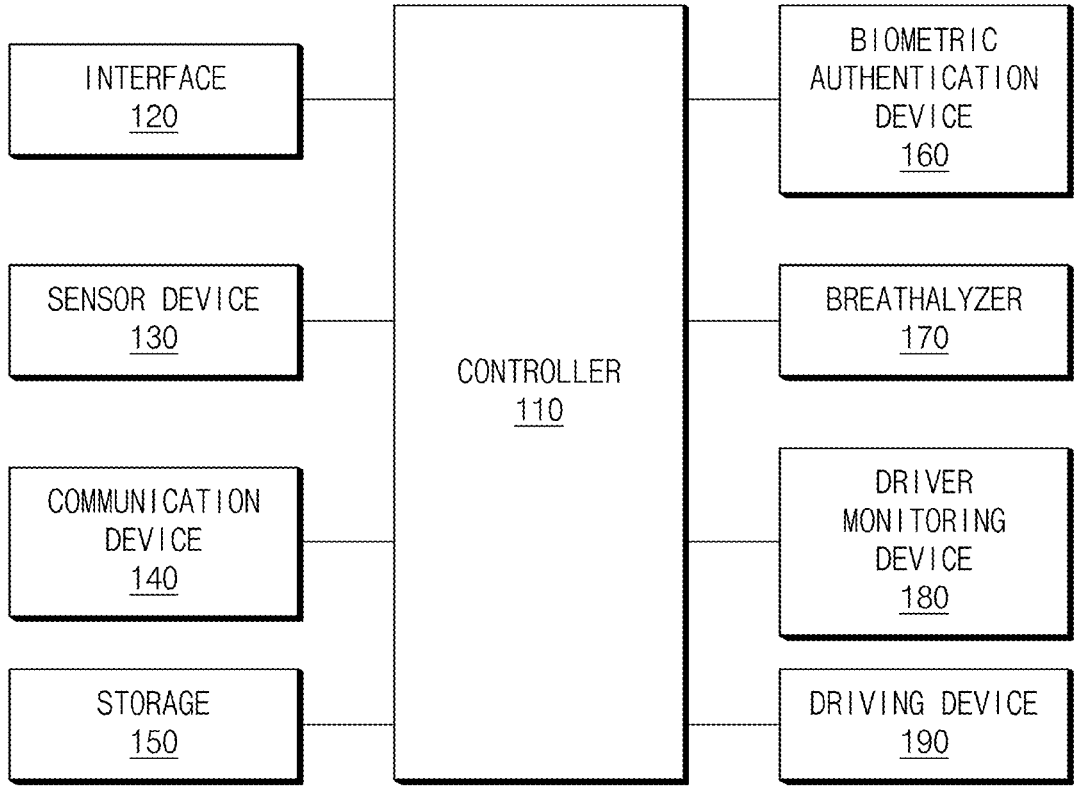
FIG. 1 is a diagram illustrating a configuration of a drunk driving prevention system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
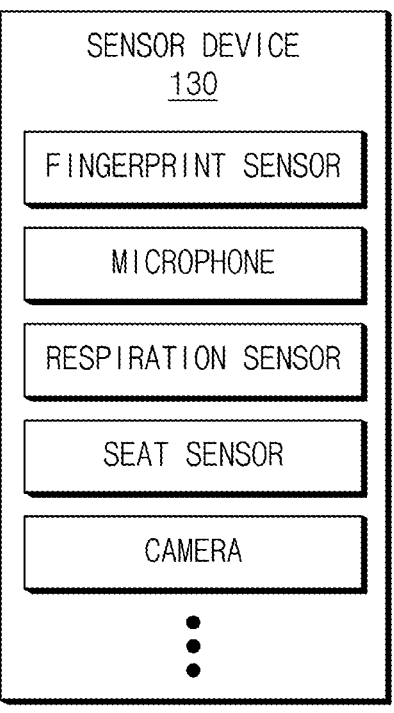
FIG. 2 is a diagram illustrating a detailed configuration of a sensor device according to an embodiment of the present disclosure.
Figure 3:
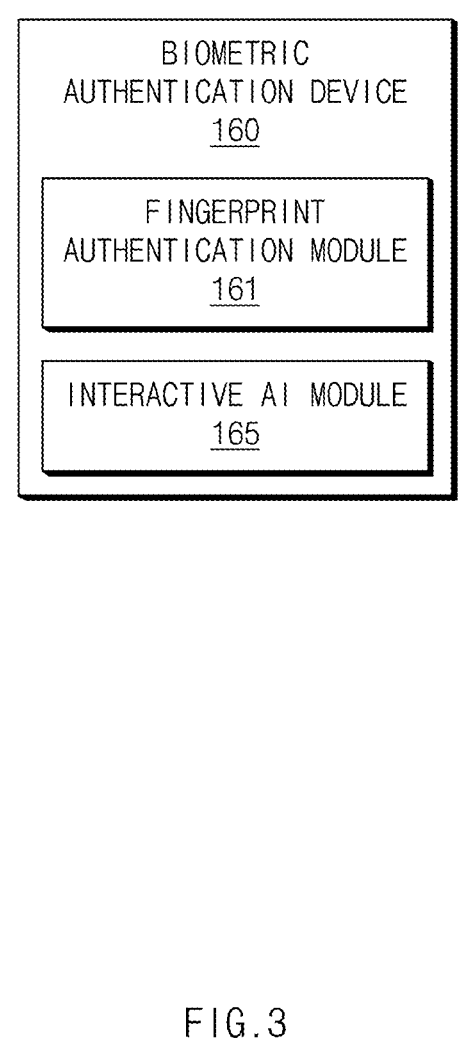

FIG. 1 is a diagram illustrating a configuration of a drunk driving prevention system according to an embodiment of the present disclosure, FIG. 2 is a diagram illustrating a detailed configuration of a sensor device according to an embodiment of the present disclosure, and FIG. 3 is a diagram illustrating a detailed configuration of a biometric authentication device according to an embodiment of the present disclosure.

The drunk driving prevention system according to the present disclosure may be implemented inside a vehicle. In this case, the drunk driving prevention system may be integrally formed with internal controllers of the vehicle, or may be implemented as a separate hardware device and connected to the controllers of the vehicle by separate connection means.

Referring to FIG. 1, a drunk driving prevention system according to an embodiment of the present disclosure may include a controller 110, an interface 120, a sensor device 130, a communication device 140, storage 150, a biometric authentication device 160, a breathalyzer 170, a driver monitoring device 180, and a drive device 190. Here, the controller 110, the biometric authentication device 160, the breathalyzer 170, and/or the driver monitoring device 180 of the drunk driving prevention system according to the present embodiment may be implemented as at least one processor.

The controller 110 may be connected to the components of the drunk driving prevention system to perform overall functions of the drunk driving prevention system. Here, the controller 110 may be a hardware device such as a processor or a central processing unit (CPU), or a program implemented by a processor.

The interface 120 may include an input means for receiving a predetermined control command and an output means for outputting an operating state and result of the drunk driving prevention system or the like.

The input means may include a key button or may include a soft key implemented on a display. Also, the input means may include a mouse, a joystick, a jog shuttle, a stylus pen, and the like.

The output means may include a display and may also include an audio output device such as a speaker. In this case, when a touch sensor such as a touch film, a touch sheet, or a touch pad is provided in the display, the display may operate as a touch screen, and may be implemented as the integrated form of the input device and the output device.

The sensor device 130 may include a sensor for acquiring information for biometric authentication of a driver, a sensor for detecting an alcohol concentration in the driver's body, a sensor for detecting the driver's state, and the like. A detailed configuration of the sensor device 130 will be given with reference to the embodiment of FIG. 2.

Referring to FIG. 2, the sensor device 130 may include a fingerprint sensor, a microphone, a respiration sensor, a seat sensor, and a camera.

Figure 4:
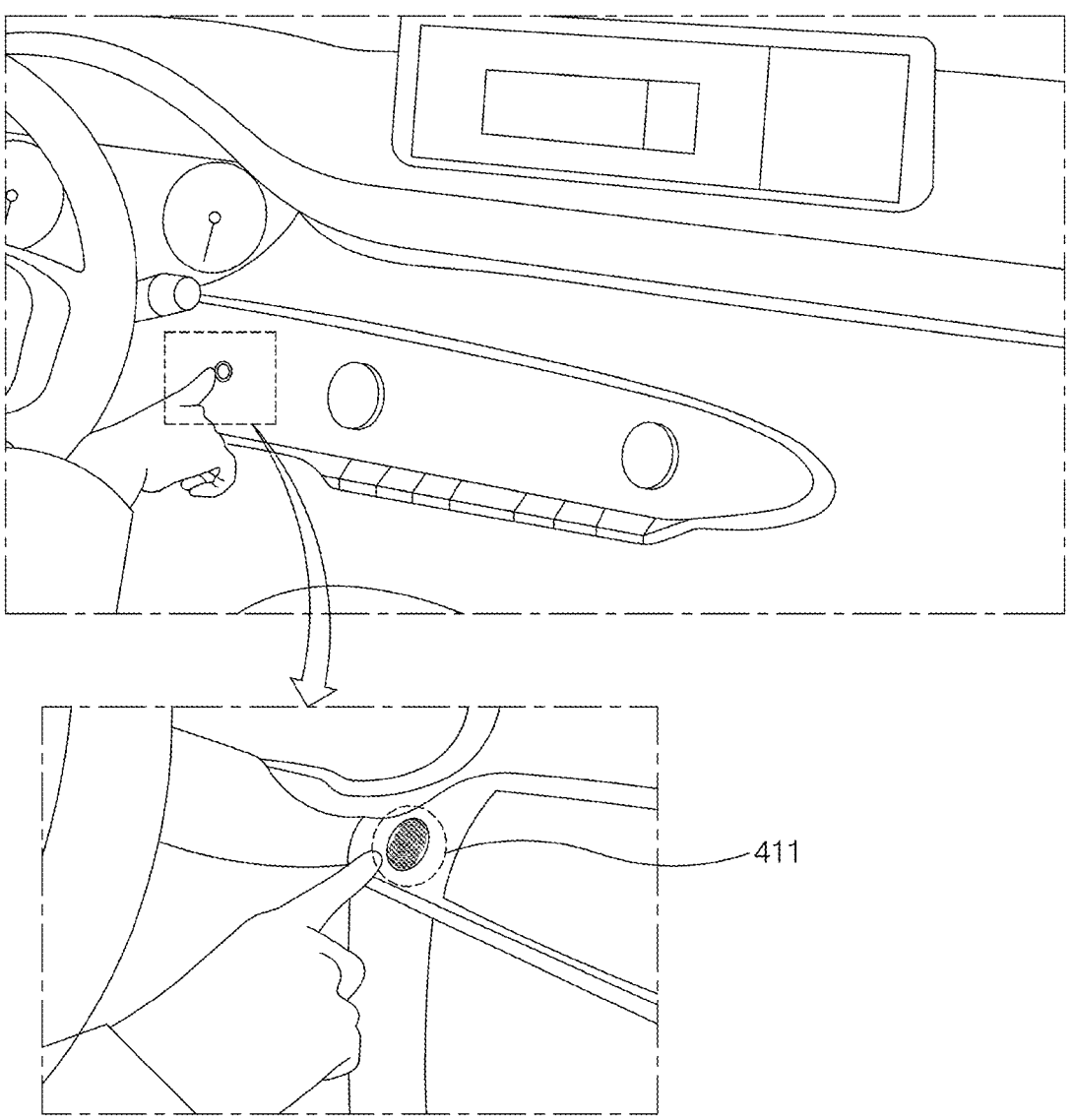
FIGS. 4, 5A and 5B are exemplary diagrams referenced to describe a biometric authentication operation according to an embodiment of the present disclosure.

The fingerprint sensor is a sensor that acquires scan data by scanning a driver's fingerprint for biometric authentication. An embodiment of the fingerprint sensor will be described with reference to FIG. 4. As shown in FIG. 4, the fingerprint sensor may be installed on startup of the vehicle button 411. In addition, the fingerprint sensor may be installed in a location where a driver is able to easily contact the fingerprint sensor while sitting in a driver's seat, such as a dashboard, a steering wheel, or a shift lever.

Like the fingerprint sensor, the microphone may be a sensor that acquires voice data for biometric authentication of the driver. For example, the microphone may be installed on a steering wheel or dashboard of a vehicle, for example.

Figure 5A:
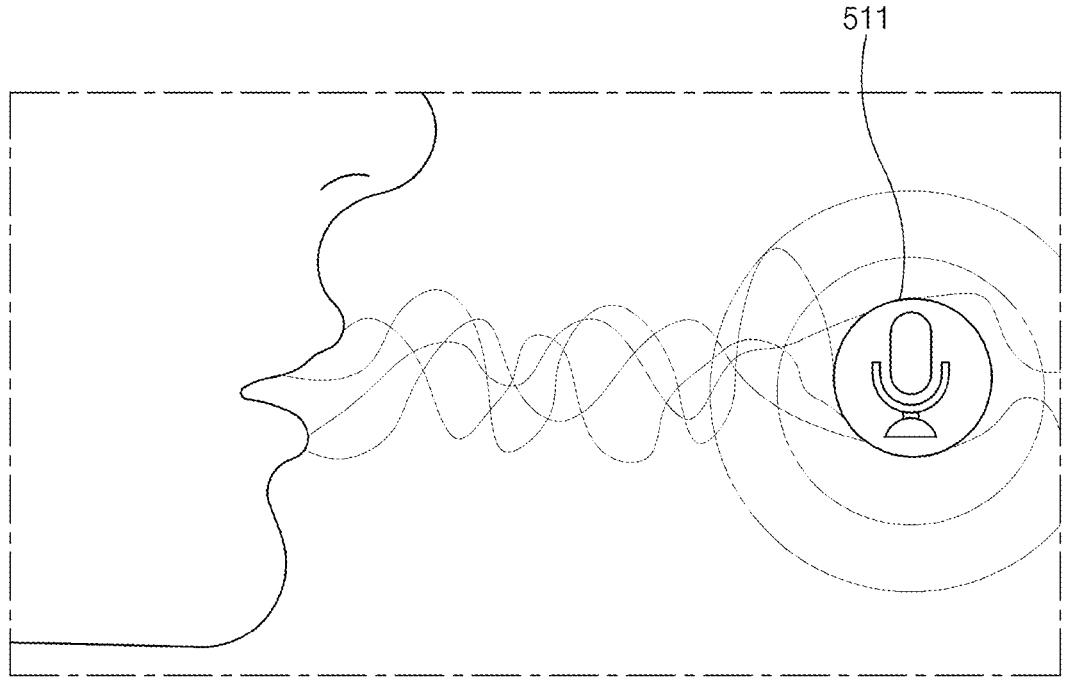
Figure 5B:
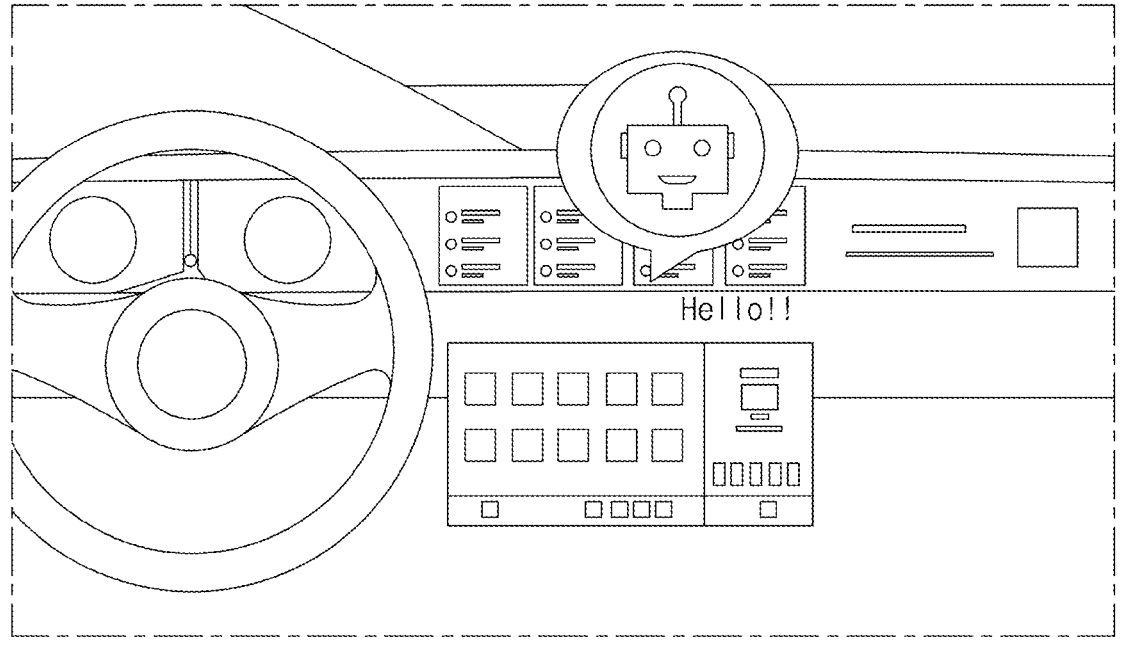

An embodiment of the biometric authentication of the driver operation using the microphone will be described with reference to FIGS. 5A and 5B. When the microphone acquires the driver's voice data and provides the voice data to the biometric authentication device 160 as shown in FIG. 5A, the biometric authentication device 160 may perform biometric authentication using the driver's voice data as shown in FIG. 5B. In this case, the biometric authentication device 160 may configure an interactive AI module 165 to query the driver and perform biometric authentication of the driver based on the driver's answer to the query.

The fingerprint sensor and the microphone may be activated for biometric authentication of the driver when there is a request for startup of the vehicle from the driver.

Figure 6A:
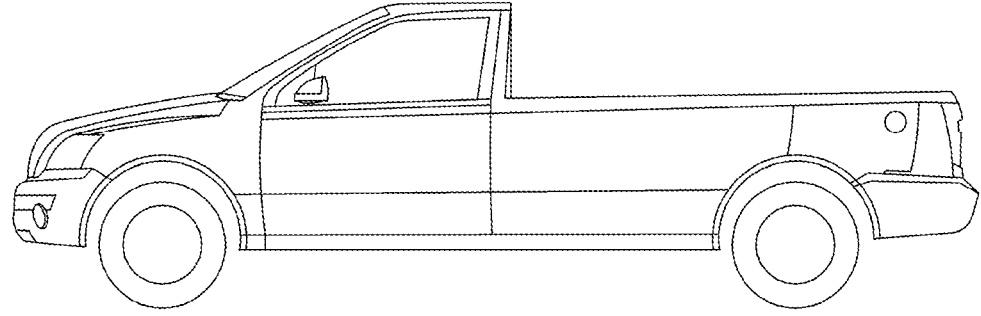
FIGS. 6A, 6B, and 6C are exemplary diagrams illustrating an embodiment of an exceptional vehicle according to an embodiment of the present disclosure.
Figure 6B:
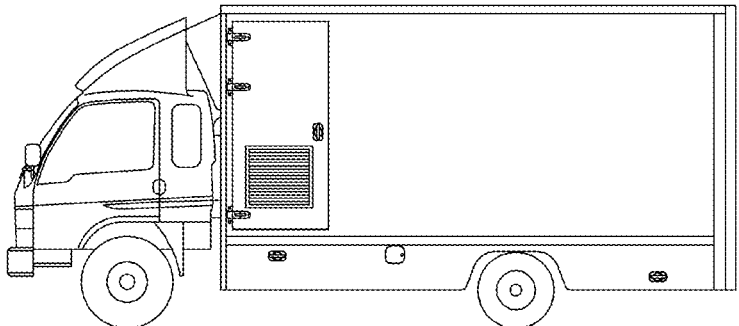

The respiration sensor may be a sensor that acquires respiration data for measuring a driver's drinking level. Here, the respiration data may include information on the driver's breathing capacity and an alcohol component in sucked breath. The respiration sensor may be provided with a fan (not shown) operated to suck the driver's breath into the sensor. An embodiment of the respiration sensor will be described with reference to FIGS. 6A and 6B. The respiration sensor may be installed near the driver's seat at a position capable of easily sucking breath exhaled by a driver. For example, the respiration sensor may be installed on a steering wheel, dashboard, or the like. The respiration sensor 611 installed on a steering wheel 11 may be represented as shown in FIG. 6A. In addition, the respiration sensor 613 installed on the dashboard may be represented as shown in FIG. 6B.

In this case, the respiration sensor may measure the driver's breathing capacity, and the controller 110 may determine whether the driver's breathing capacity is sufficient to measure a drinking level, and when the driver's breathing capacity is insufficient, request the driver to exhale more breathing capacity. For example, the controller 110 may output a message requesting re-measurement of breathing to the driver through a display or may output a voice message through an audio output means. On the other hand, the controller 110 may turn on a green lamp when the breathing capacity is sufficient, and turn on a red lamp when re-measurement of respiration is required after separate lamps have been installed around the respiration sensor.

The camera may capture an image including a driver seated in a driver's seat. When a passenger other than the driver gets into the vehicle, the camera may capture an image including the passenger to identify the position of the passenger. For example, the camera may be installed near the driver's seat inside the vehicle, and may be installed at a location such as a room mirror or a dashboard to capture not only the driver's seat but also the passenger's seat. An embodiment for the installation location and operation of the camera, will be described with reference to FIGS. 7A and 7B.

A seat sensor may be a sensor installed on each seat inside the vehicle to detect the seated state of a driver or a passenger. The seat sensor may be composed of weight sensors or capacitance sensors to detect the seated state through the weight of the driver and/or passenger or a change in capacitance according to the weight of the driver and/or passenger when the driver and/or passenger is seated in a seat. An embodiment of the installation location of the seat sensor will be described with reference to FIG. 8.

When the biometric authentication of the driver is completed, the respiration sensor may be activated to measure the driver's drinking level, and the seat sensor and the camera may be activated to detect the driver's and passengers' positions and states while the respiration sensor is measuring respiration data.

The communication device 140 may include a communication module for vehicle network communication with electrical components and/or controllers provided in the vehicle. Here, the vehicle network communication technology may include Controller Area Network (CAN) communication, Local Interconnect Network (LIN) communication, Flex-Ray communication, and the like.

In addition, the communication device 140 may include a communication module for wireless Internet connection or a communication module for short range communication. Here, the wireless Internet technology may include a wireless LAN (WLAN), wireless broadband (Wibro), Wi-Fi, World Interoperability for Microwave Access (Wimax), and the like. In addition, the short-range communication technology may include Bluetooth, ZigBee, Ultra-Wideband (UWB), Radio Frequency Identification (RFID), Infrared Data Association (IrDA), and the like.

The storage 150 may store data and/or algorithms necessary for the drunk driving prevention system to operate. As an example, the storage 150 may store authentication information of drivers registered in the vehicle. In addition, the storage 150 may store a reference condition for determining the driver's drinking level and a command and/or algorithm for a sobriety test. Also, the storage 150 may store instructions and/or algorithms for monitoring a state of a driver.

In the disclosure, the storage 150 may include storage media, such as a random access memory (RAM), a static random access memory (SRAM), a read only memory (ROM), a programmable read-only memory (PROM), an electrically erasable programmable read-only memory (EE-PROM) and the like.

When there is a request for startup of the vehicle from the driver, the controller 110 may perform a biometric authentication and a sobriety test for the driver before starting the vehicle.

First, the controller 110 may activate the fingerprint sensor and the microphone and activate the biometric authentication device 160 for biometric authentication of the driver.

Here, the fingerprint sensor may be installed on startup button 411 as shown in FIG. 4, but is not limited thereto.

The fingerprint sensor may transmit scan data acquired by scanning the driver's fingerprint to the biometric authentication device 160 through the communication device 140.

Referring to FIG. 3, the biometric authentication device 160 may include a fingerprint authentication module 161 and the interactive AI module 165.

The biometric authentication device 160 may operate the fingerprint authentication module 161, analyze the scan data obtained from the fingerprint sensor through the fingerprint authentication module 161 to determine whether the driver's fingerprint matches the driver's fingerprint registered in advance, and authenticate the driver according to a result of the determination.

In addition, the microphone may obtain the driver's voice data from the microphone and transmit the voice data to the biometric authentication device 160 through the communication device 140, as shown by reference numeral 511 in FIG. 5A. Accordingly, the biometric authentication device 160 may analyze the voice data obtained from the microphone, determine whether the obtained voice data matches the driver's voice registered in advance, and authenticate the driver according to a result of the determination.

Also, as shown in FIG. 5B, the biometric authentication device 160 may operate the interactive AI module 165 to attempt a conversation with the driver through the interactive AI module 165. The interactive AI module 165 may ask a question to the driver and recognize the driver's answer to the question to authenticate the driver.

As described above, the biometric authentication device 160 may perform biometric authentication phases using the driver's fingerprint, voice, and question and answer through conversation with the driver, and transfer a result of the biometric authentication to the controller 110.

In the case of a general vehicle, as described above, the biometric authentication device 160 may perform biometric authentication phases step by step for recognition of the driver's fingerprint, recognition of the driver's voice, and question and answer through conversation with the driver.

Meanwhile, in the case of an exceptional vehicle in which the front seat of the vehicle is configured as an independent space, it is possible to omit some biometric authentication steps compared to general vehicles because the front seat is configured as an independent space.

Figure 6C:
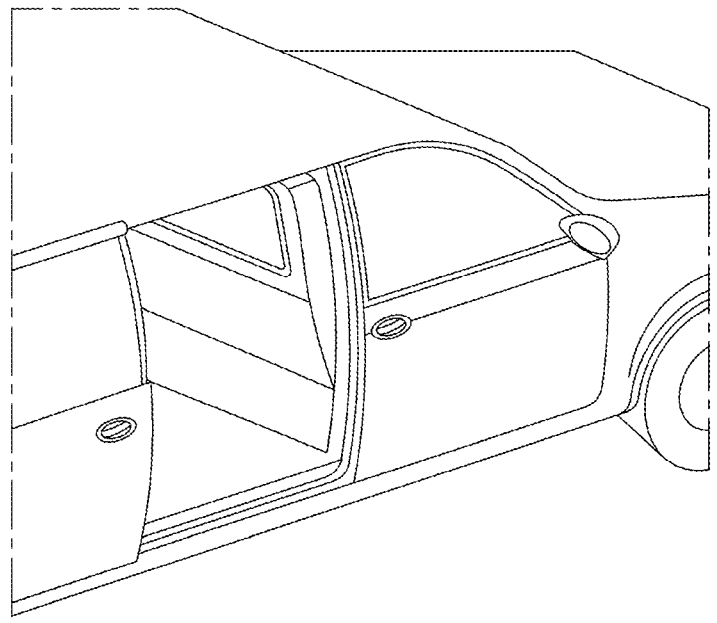

FIGS. 6A, 6B, and 6C are exemplary diagrams illustrating an embodiment of an exceptional vehicle according to an embodiment of the present disclosure; Specifically, FIG. 6A is a view showing a pickup truck that is open to the outside without rear seats and has only front seats, FIG. 6B is a view showing a vehicle having a container installed instead of rear seats and only front seats, and FIG. 6C is a view showing a vehicle in which a safety partition is installed between the front seats and the rear seats, such as a police car or escort vehicle.

The vehicles shown in FIGS. 6A, 6B, and 6C may be defined as exceptional vehicles because the front seat of the vehicle is exceptionally configured as an independent space. Accordingly, in the case of the exceptional vehicles shown in FIGS. 6A, 6B, and 6C, the biometric authentication device 160 may adjust the biometric authentication phases for the driver and perform biometric authentication of the driver based on the adjusted biometric authentication phases.

For example, the biometric authentication device 160 may perform only one specified biometric authentication phase among the recognition of the driver's fingerprint, the recognition of the driver's voice, and question and answer through conversation with the driver. Meanwhile, the biometric authentication device 160 may perform only two specified biometric authentication phases among the recognition of the driver's fingerprint, the recognition of the driver's voice, and question and answer through conversation with the driver.

In this way, the biometric authentication device 160 may perform the biometric authentication of the driver based on the adjusted biometric authentication phase among the recognition of the driver's fingerprint, the recognition of the driver's voice, and question and answer through conversation with the driver, and transfer the result of the biometric authentication to the controller 110. Hereinafter, functions and operations of components of the exceptional vehicle will be described.

The controller 110 may receive a result of the biometric authentication of the driver from the biometric authentication device 160, and when it is identified that the biometric authentication of the driver has failed, inform the driver of failure of the biometric authentication and wait until the next biometric information is input.

Meanwhile, when it is identified that the biometric authentication of the driver is successful, the controller 110 may activate a system, units, and/or functions for measuring the driver's drinking level before starting the exceptional vehicle. For example, when the biometric authentication of the driver is successful, the controller 110 may activate a drinking measurement function and a driver monitoring function.

Accordingly, the breathalyzer 170 that performs the drinking measurement function of the vehicle and a sensor that operates in cooperation with the breathalyzer 170, for example, a respiration sensor, may be activated. In addition, the driver monitoring device 180 that performs the driver monitoring function and sensors that operate in cooperation with the driver monitoring device 180, for example, a seat sensor and a camera, may be activated.

First, when the drinking measurement function is activated, the controller 110 may request the driver to perform respiration measurement to obtain respiration data from the respiration sensor. In this case, the controller 110 may output a message requesting respiration measurement through a display or a voice output means.

Figure 7A:
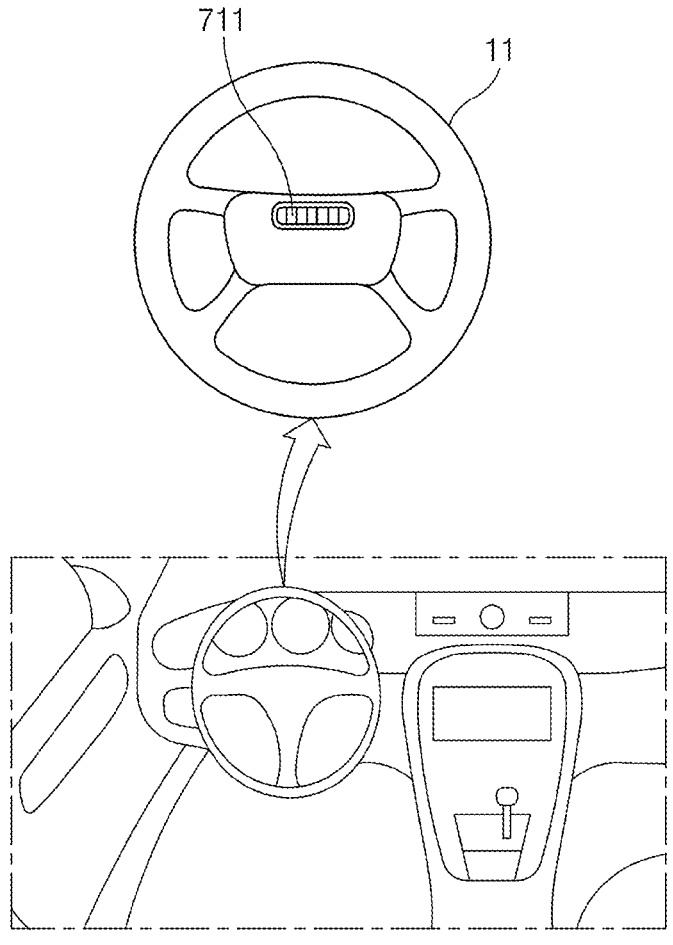
FIGS. 7A and 7B are exemplary diagrams referenced to describe a sobriety test operation according to an embodiment of the present disclosure.

As shown in reference numeral 711 of FIG. 7A, when the respiration sensor is provided on the steering wheel 11, the driver breathes out toward the respiration sensor provided on the steering wheel.

Figure 7B:
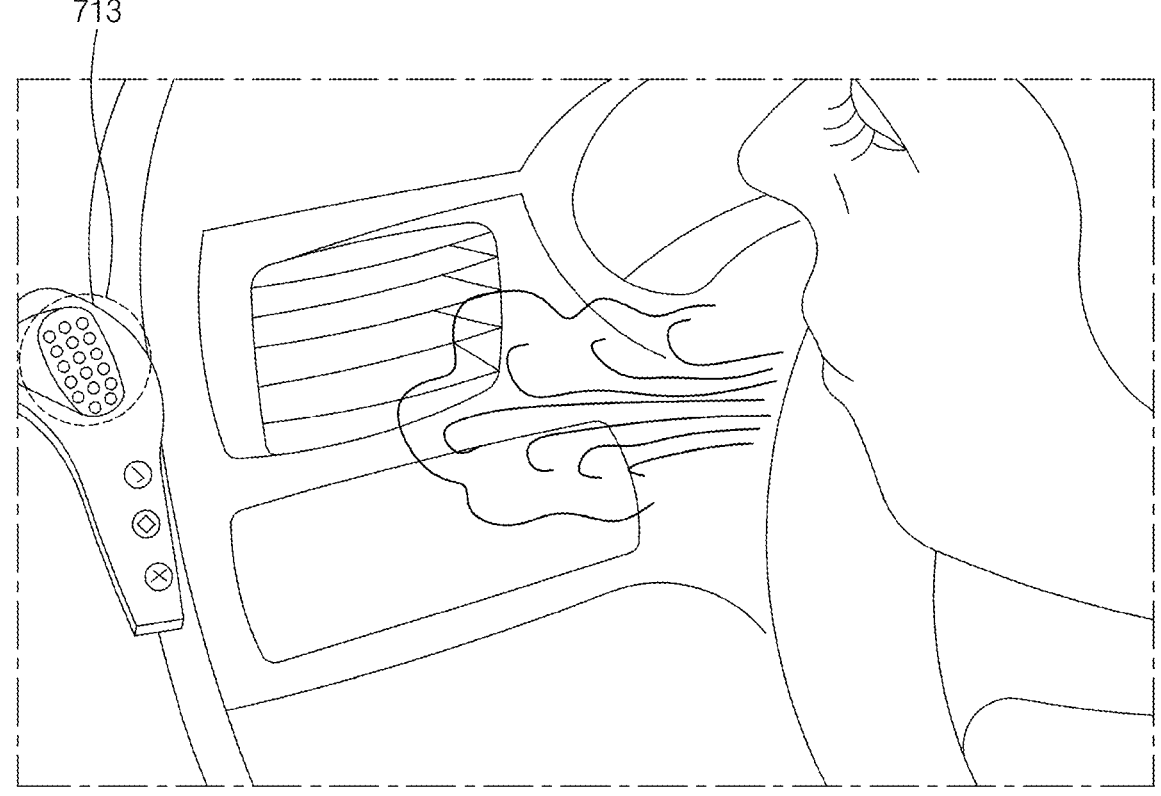

On the other hand, as shown in reference numeral 713 of FIG. 7B, when the respiration sensor is provided on a dashboard, the driver breathes out toward the respiration sensor provided on the dashboard.

When the respiration sensor starts measuring the driver's respiration, the respiration sensor may acquire the driver's respiration data flowing into the sensor. Here, the respiration data may include information on the driver's breathing capacity and the alcohol component in the inhaled breath.

The breathalyzer 170 may determine the driver's drinking level based on the respiration data from the respiration sensor. To determine the drinking level in the breathalyzer 170, a breathing capacity of a predetermined amount or more may be required. Accordingly, when the driver's breathing capacity included in the respiratory data is less than a reference value, the controller 110 may output a message requesting the driver to take sobriety test again while increasing the breathing capacity through a display or a voice output means. According to an embodiment, the controller 110 may increase acquisition of the breathing capacity by driving a fan provided in the respiration sensor.

The breathalyzer 170 may determine whether information on the alcohol component in the driver's respiration exceeds a first reference value or a second reference value by analyzing the respiration data, and determine the driver's drinking level based on a result of the determination.

Here, the first reference value and the second reference value may be set as blood alcohol content (BAC) values. The first reference value may be set as a BAC value capable of determining whether alcohol is consumed or not. The second reference value may be greater than the first reference value and may be set as the acceptable (herein, "acceptable" could refer to a legal standard set by the government, etc. This would also broaden the interpretive scope of "acceptable.") BAC. Accordingly, the second reference value may be set differently for each country.

For example, when the alcohol concentration in the driver's breath is equal to or less than the first reference value, the breathalyzer 170 may determine that the driver is not in a drunk state and transmit the result to the controller 110.

When the alcohol concentration in the driver's breath is greater than the first reference value but is less than the second reference value, the breathalyzer 170 may determine that the driver is in an acceptable drinking level and transmit the result to the controller 110.

When the alcohol concentration in the driver's breath is greater than the second reference value, the breathalyzer 170 may determine that the driver is in an unacceptable drinking level, and transmit the result to the controller 110.

In the above, it has been described as an example of measuring the concentration of alcohol in the driver's breath using a respiration sensor and determining the driver's drinking level based on the concentration of alcohol, but the present disclosure is not limited thereto, and various methods for measuring the driver's alcohol concentration, such as measuring the alcohol concentration under the skin in contact with a sensor using infrared rays, may be applied.

While the driver's sobriety test is being performed, the driver monitoring function may be activated, and when the driver monitoring system is activated, the driver monitoring device 180 may monitor a state of the driver using a seat sensor and a camera to determine whether a subject for drinking measurement is a driver.

Figure 8A:
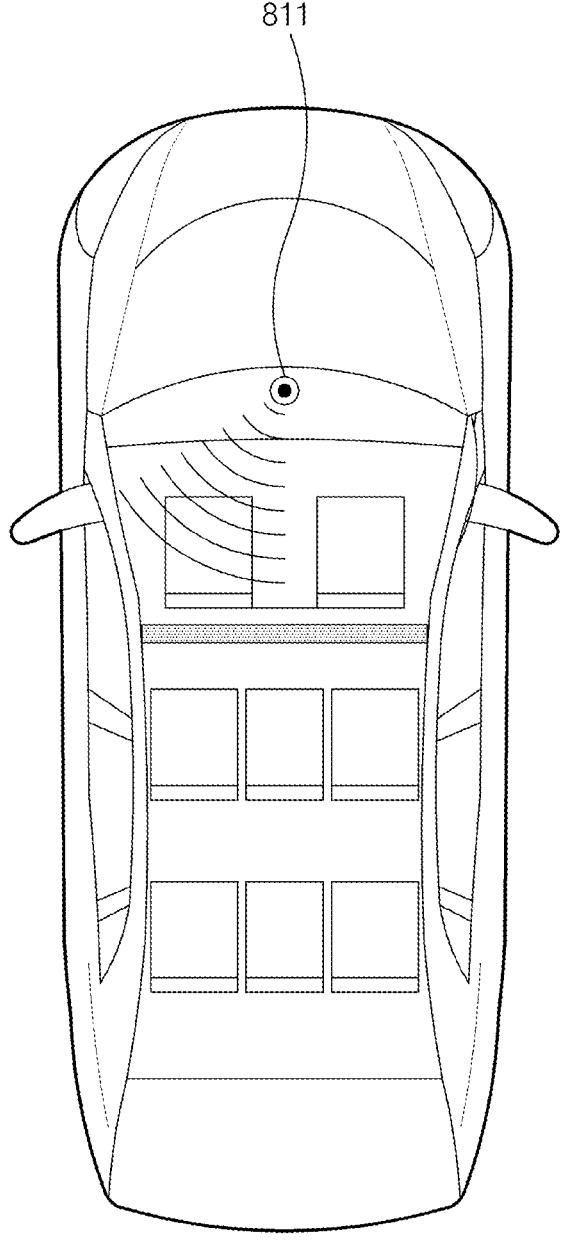
FIGS. 8A, 8B, and 9 are exemplary diagrams referenced to describe a driver monitoring operation according to an embodiment of the present disclosure.

While measuring the driver's drinking level, as shown in FIG. 8A, a camera installed at the rearview mirror position 811 of the vehicle may capture an image including the driver's seat in the vehicle. Of course, the installation location of the camera may be changed as much as possible within a range capable of capturing an image including the driver's seat in the vehicle.

Figure 8B:
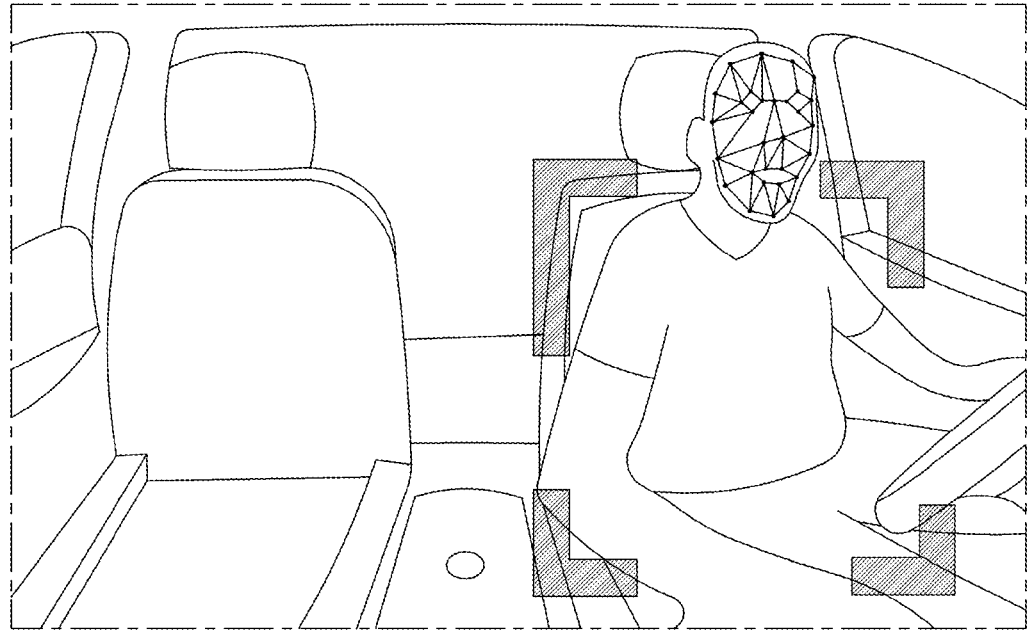

Accordingly, as shown in FIG. 8B, the driver monitoring device 180 may analyze the image captured by the camera to recognize the face of a subject for drinking measurement, and determine whether the subject for drinking measurement is an authenticated driver based on a result of the face recognition.

Figure 9:
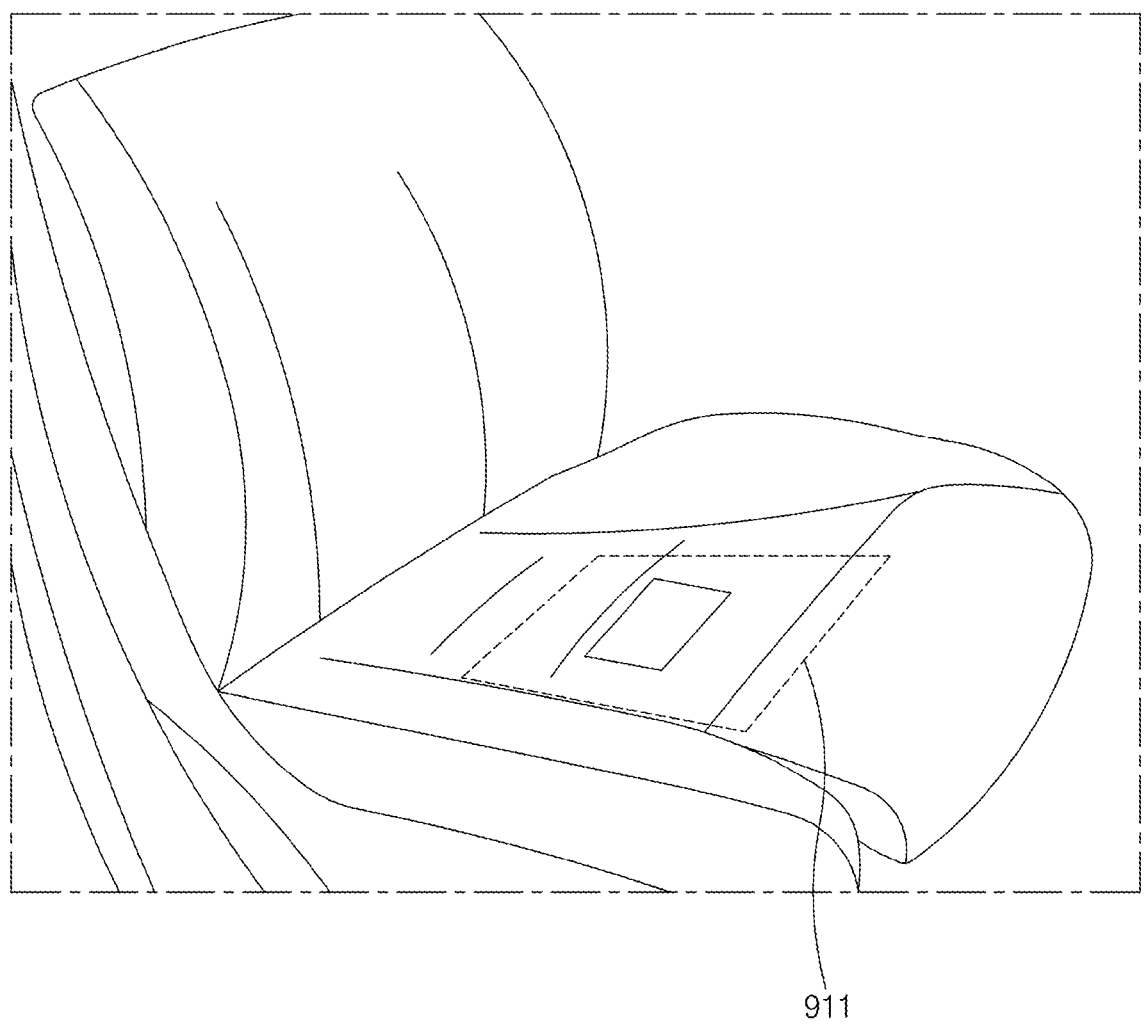

Similarly, as shown in FIG. 9, the driver monitoring device 180 may recognize the weight and physique of the subject for drinking measurement using a seat sensor installed on a buttock contact surface 911 of each seat in the vehicle, and determine whether the subject for drinking measurement is an authenticated driver based on a result of the recognition.

For example, when the driver's weight and body type information is stored, the seat sensor may obtain information such as the weight and body type of a passenger detected in the driver's seat. Accordingly, the driver monitoring device 180 may recognize the driver by comparing the weight and body type of the passenger acquired by the seat sensor with pre-stored information.

The driver monitoring device 180 may determine whether the subject for drinking measurement is a corresponding driver based on a result of the determination, and transmit the result to the controller 110.

As described above, the driver monitoring device 180 may continuously monitor the state of the driver until the sobriety test of the driver is finished.

When it is determined that the subject for drinking measurement is not an authorized driver while the driver's drinking level is being measured, the controller 110 may determine that the sobriety test has been performed in an illegal manner and output a warning. In this case, the controller 110 may terminate the sobriety test and block startup of the vehicle until there is the next request for startup of the vehicle.

When the driver's sobriety test is completed, the controller 110 may identify a result of the driver's sobriety test from the breathalyzer 170 and determine whether to start the vehicle based on the result.

When it is determined from the breathalyzer 170 that the driver is not in a drunk state, the controller 110 may allow startup of the vehicle for a corresponding driver. Accordingly, the drive device 190 may operate a vehicle starting device when startup of the vehicle is allowed by the controller 110.

In addition, the controller 110 may allow startup of the vehicle for a corresponding driver even when it is identified from the breathalyzer 170 that the driver is in an acceptable drinking level. However, since the driver has consumed alcohol, the controller 110 may activate the driver monitoring system to continuously monitor the state of the driver even after startup of the vehicle.

On the other hand, when it is identified from the breathalyzer 170 that the driver is in a drunk state, the controller 110 may block startup of the vehicle for a corresponding driver and notify that startup of the vehicle is blocked due to drinking.

Accordingly, when the start of the vehicle is blocked by the controller 110, the drive device 190 may lock a vehicle starting device to make startup of the vehicle impossible.

The drunk driving prevention system according to the present embodiment operating in the manner described above may be implemented in the form of an independent hardware device including a memory and a processor for processing each operation and may be implemented in the form included in other hardware devices such as a microprocessor or general purpose computer system.

The operational flow of the drunk driving prevention system according to the present disclosure configured as described above will be described in detail as follows.

Figure 10B:
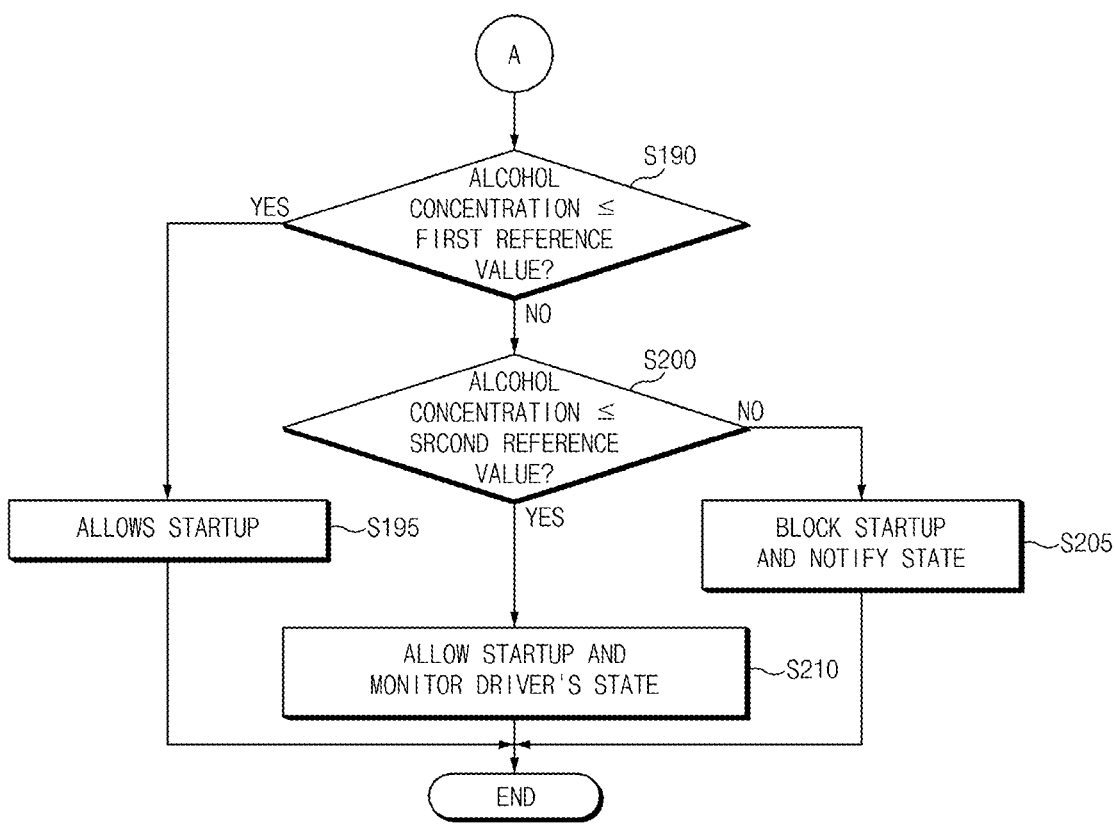

FIGS. 10A and 10B are a diagram illustrating an operational flow of a drunk driving prevention method according to an embodiment of the present disclosure.

Referring to FIGS. 10A and 10B, when the start button of a vehicle is operated (S110), the drunk driving prevention system may adjust biometric authentication phases of the driver if the vehicle is an exceptional vehicle (S120, S130). In 'S130', the biometric authentication phases of the driver may be adjusted to include one or two of recognition of the driver's fingerprint, recognition of the driver's voice, and question and answer using an interactive AI module. Here, the biometric authentication phases of the driver may be adjusted differently depending on the purpose of the exceptional vehicle and the driver's level of trust.

Thereafter, the drunk driving prevention system may perform biometric authentication of the driver based on the biometric authentication phases adjusted in 'S130' (S140). In 'S140', the drunk driving prevention system may perform biometric authentication of the driver for items adjusted in 'S130' among recognition of the driver's fingerprint, recognition of the driver's voice, and question and answer using an interactive AI module.

When the drunk driving prevention system fails in biometric authentication of the driver (S150), the drunk driving prevention system may notify failure of the biometric authentication (S155).

On the other hand, when the drunk driving prevention system succeeds in biometric authentication of the driver in 'S150', the drunk driving prevention system may activate a drinking measurement function and a driver monitoring function (S160), and start a sobriety test for the driver and monitor the state of the driver (S170).

The drunk driving prevention system may identify whether a subject for drinking measurement is the driver by monitoring the state of the driver during the sobriety test.

For example, the drunk driving prevention system may analyze an image obtained from a camera that captures a driver's seat space of an exceptional vehicle while measuring a driver's drinking state, recognize the face of the subject for drinking measurement, and determine whether the subject for drinking measurement is the driver based on a result of the face recognition.

In addition, the drunk driving prevention system may analyze the data obtained from a seat sensor in the driver's seat while measuring the driver's drinking level, recognize the weight and physique of the subject for drinking measurement, and determine whether the subject for drinking measurement is the driver based on a result of the recognition.

When it is determined that the subject for drinking measurement is not the driver (S180), the drunk driving prevention system may provide a guide so as to allow the driver to re-measure drinking (S185). The drunk driving prevention system may provide a guide to take the sobriety test again when the measured breathing capacity of the driver is less than a reference value.

The drunk driving prevention system may identify the measured alcohol concentration from the driver when the subject for drinking measurement is an authenticated driver and the sobriety test is completed.

In this case, when the alcohol concentration of the driver is equal to or less than a first reference value (S190), the drunk driving prevention system may allow startup of a vehicle (S195).

In addition, when the driver's alcohol concentration is greater than the first reference value and is equal to or less than the second reference value (S200), the drunk driving prevention system may allow startup of the vehicle but also monitor the state of the driver (S210).

On the other hand, when the driver's alcohol concentration is greater than the second reference value (S200), the drunk driving prevention system may block startup of the vehicle and notify that the vehicle is blocked startup (S205).

As described above, in the drunk driving prevention system and method according to an embodiment of the present disclosure, when the driver's blood alcohol concentration exceeds a legal limit, it is possible to prevent drunk driving in advance by blocking the start of the vehicle and more strongly prevent a drinking accident from occurring in the future by strengthening the biometric authentication of the driver and preventing another person from taking the sobriety test instead through driver monitoring. In addition, in the case of an exceptional vehicle where a front seat space is configured as an independent space, because it is unnecessary to identify the states of a backseat passenger during the sobriety test, it is possible to increase the operational efficiency of the drunk driving prevention system by adjusting the biometric authentication phases of the driver and omitting the status monitoring of the passenger.

The above description is merely illustrative of the technical idea of the present disclosure, and various modifications and variations may be made without departing from the essential characteristics of the present disclosure by those skilled in the art to which the present disclosure pertains.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

According to the embodiments of the present disclosure, it is possible to perform driver authentication through several phases when measuring the driver's drinking level, and at the same time, monitor the states of a driver and passengers in a vehicle during the measurement of the drinking level, thereby facilitating driver identification and a sobriety test, and preventing a drunk driving accident by blocking startup of the vehicle when a driver is a drunk state.

Further, according to the embodiments of the present disclosure, it is possible to adjust biometric authentication phases for a driver and omitting monitoring of a passenger's state to increase the operating efficiency of the system because it is unnecessary to identify the state of a backseat passenger during the sobriety test in the case of an exceptional vehicle in which a front seat space is configured as an independent space.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A drunk driving prevention system comprising:
a multi-stage biometric authentication device configured to perform a biometric authentication of a driver when startup of a vehicle is requested;
a breathalyzer configured to measure a drinking level of the driver whose biometric authentication has been completed;
a driver monitoring device configured to monitor state of the driver in the vehicle while the drinking level of the driver is measured; and
a controller configured to allow or block startup of the vehicle based on a result of measuring the drinking level of the driver,
wherein the biometric authentication device is configured to adjust biometric authentication phases for the driver in a case of an exceptional vehicle where a front seat of the vehicle is configured as an independent space,
wherein the biometric authentication device is configured to perform the biometric authentication of the driver based on the adjusted biometric authentication phases among recognition of a driver's fingerprint, recognition of a driver's voice, and question and answer through conversation with the driver, when the vehicle is the exceptional vehicle.

2. The drunk driving prevention system of claim 1, wherein the biometric authentication device includes:

a fingerprint recognition module configured to recognize the driver by determining whether the fingerprint obtained from the driver matches a previously registered fingerprint of the driver; and
an interactive AI module configured to recognize the driver's voice, asks the driver a question, and recognize the driver based on a driver's response to the question.

3. The drunk driving prevention system of claim 1, wherein the controller is configured to activate a drinking measurement function and a driver monitoring function when the biometric authentication of the driver is successful.

4. The drunk driving prevention system of claim 3, wherein the breathalyzer is configured to compare alcohol concentration information of the driver obtained from a breathalyzer sensor installed in the vehicle with a preset first reference value and a preset second reference value to measure the drinking level of the driver, when the drinking measurement function is activated.

5. The drunk driving prevention system of claim 4, wherein the first reference value is set to a blood alcohol concentration value for determining whether alcohol is consumed, and
wherein the second reference value is set to an acceptable blood alcohol concentration.

6. The drunk driving prevention system of claim 5, wherein the breathalyzer is configured to:
determine that the driver is not in a drunk state when the alcohol concentration of the driver is less than or equal to the first reference value,
determine that the alcohol concentration of the driver is acceptable when the alcohol concentration of the driver is greater than the first reference value and is less than or equal to the second reference value, and
determine that the driver is in a drunk state when the alcohol concentration of the driver is greater than the second reference value.

7. The drunk driving prevention system of claim 6, wherein the controller is configured to:
allow startup of the vehicle when it is identified that the driver is not in the drunk state,
allow startup of the vehicle and activate the driver monitoring function, when it is identified that the driver is in an acceptable drinking level, and
block startup of the vehicle when it is identified that the driver is in the drunk state.

8. The drunk driving prevention system of claim 4, wherein the driver monitoring device is configured to determine whether a person subject to a sobriety test is an authenticated driver while the drinking level of the driver is measured when the driver monitoring function is activated.

9. The drunk driving prevention system of claim 8, wherein the driver monitoring device is configured to recognize a face of the subject for drinking measurement by analyzing an image obtained from a camera that captures a space of a driver seat of the exceptional vehicle while the drinking level of the driver is measured, and determine whether the subject for drinking measurement is the authenticated driver based on a result of the face recognition.

10. The drunk driving prevention system of claim 8, wherein the driver monitoring device is configured to recognize a weight and a physique of the subject to the sobriety test by analyzing data obtained from a seat sensor of a driver seat and determine whether the subject for drinking measurement is the authenticated driver based on a result of the recognition.

11. The drunk driving prevention system of claim 8, wherein the controller is configured to guide the driver to take the sobriety test again when it is identified that the subject for drinking measurement is not the driver, and wherein the breathalyzer is configured to re-measure the drinking level of the driver.

12. A drunk driving prevention method comprising:

performing a multi-step biometric authentication of a driver when startup of a vehicle is requested;

measuring a drinking level of a driver whose biometric authentication has been completed;

monitoring state of the driver in the vehicle while a drinking level of the driver is measured; and allowing or blocking startup of the vehicle based on a result of measuring the drinking level of the driver, wherein the drunk driving prevention method further comprises adjusting biometric authentication phases for the driver in a case of an exceptional vehicle where a front seat of the vehicle is configured as an independent space, wherein the performing of the biometric authentication of the driver step by step includes performing the biometric authentication of the driver based on the adjusted biometric authentication phases among recognition of a driver's fingerprint, recognition of a driver's voice, and question and answer through conversation with the driver, when the vehicle is the exceptional vehicle.

13. The drunk driving prevention method of claim 12, further comprising:

activating a drinking measurement function and a driver monitoring function, when the biometric authentication of the driver is successful.

14. The drunk driving prevention method of claim 13, wherein the measuring of the drinking level includes:

comparing alcohol concentration information of the driver obtained from a breathalyzer sensor installed in the vehicle with a preset first reference value and a preset second reference value, determining that the driver is not in a drunk state when the alcohol concentration of the driver is less than or equal to the first reference value, determining that the alcohol concentration of the driver is acceptable when the alcohol concentration of the driver is greater than the first reference value and is less than or equal to the second reference value, and

16 determining that the driver is in the drunk state when the alcohol concentration of the driver is greater than the second reference value.

15. The drunk driving prevention method of claim 14, wherein the first reference value is set to a blood alcohol concentration value for determining whether alcohol is consumed, and wherein the second reference value is set to an acceptable blood alcohol concentration.

16. The drunk driving prevention method of claim 14, wherein the allowing or blocking startup of the vehicle includes allowing startup of the vehicle when it is identified that the driver is not in the drunk state;

allowing startup of the vehicle and activating the driver monitoring function, when it is identified that the driver is in an acceptable drinking level; and blocking startup of the vehicle when it is identified that the driver is in a drunk state.

17. The drunk driving prevention method of claim 13, wherein the monitoring of the driver includes:

recognizing a face of a subject for drinking measurement by analyzing an image obtained from a camera that captures a driver seat space of the exceptional vehicle while the drinking level of the driver is measured, and determining whether the subject for drinking measurement is the driver based on a result of the face recognition, when the driver monitoring function is activated; and recognizing a weight and a physique of the subject to a sobriety test by analyzing data obtained from a seat sensor of the driver seat and determining whether the subject for drinking measurement is the driver based on a result of the recognition.

18. The drunk driving prevention method of claim 17, further comprising:

guiding the driver to take the sobriety test again when it is identified that the subject for drinking measurement is not the driver, and re-measuring the drinking level of the driver.

* * * * *